UNITED STATES PATENT OFFICE.

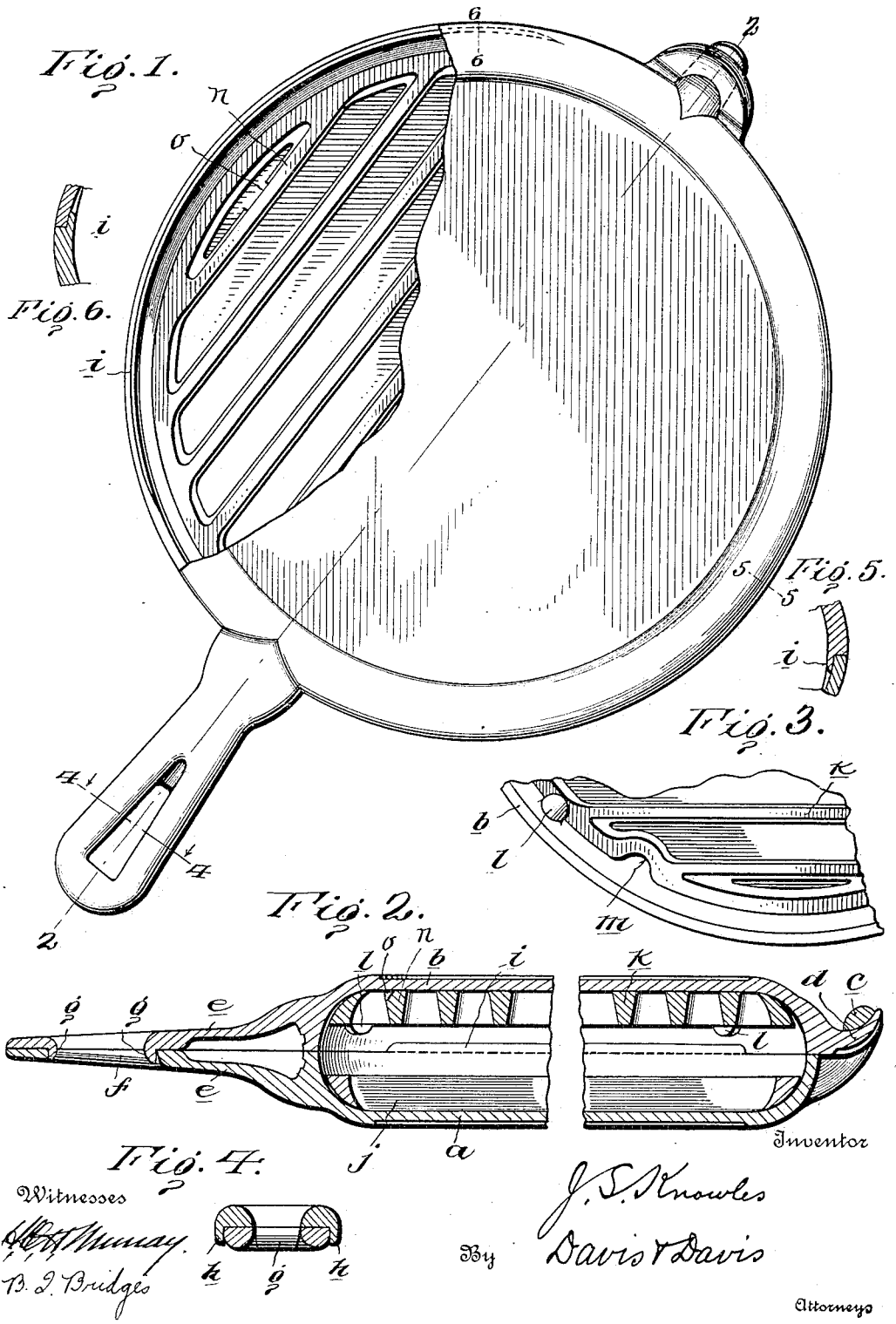

JOSEPH S. KNOWLES, OF ATLANTA, ILLINOIS.

COOKING UTENSIL.

1,091,517. Specification of Letters Patent. Patented Mar. 31, 1914.

Application filed January 22, 1913. Serial No. 743,545.

*To all whom it may concern:*

Be it known that I, JOSEPH S. KNOWLES, a citizen of the United States, and a resident of Atlanta, county of Logan, State of Illinois, have invented certain new and useful Improvements in Cooking Utensils, of which the following is a full and clear specification, reference being had to the accompanying drawings, in which—

Figure 1 is a plan view partly broken away; Fig. 2 is a vertical sectional view of the utensil complete; Fig. 3 is a detail view of a portion of the inner side of the upper pan; Fig. 4 a transverse section taken on the line 4—4 of Fig. 1; and Figs. 5 and 6 detail transverse sections taken respectively on the lines 5—5 and 6—6 of Fig. 1.

The object of this invention is to provide a simple cooking utensil which may be used to cook various food articles in a variety of ways and which will retain within it all the meat juices and the cooking odors, as more fully hereinafter set forth.

In the drawing, the reference character $a$ designates the lower pan and $b$ the upper pan, these pans being circular in shape and being dished and furthermore being exact counter-parts of each other so that the upper pan may be inverted and placed rim to rim on the lower pan, the contacting edges of the rims being adapted to fit closely together to confine the meat juices and the cooking odors.

At one side a suitable disconnectible hinge is provided, consisting of an eye or hook $c$ cast on one of the pans and a curved hook $d$ cast on the other pan whereby either pan may be removed from the other. Each pan is provided at a point opposite said hinge with a handle member $e$, these members being counter-parts of each other and having their faces shaped so as to fit flatly together. A longitudinal slot $f$ is formed in the lower member and the upper member is provided with a pair of lugs $g$ which enter said slot and engage the opposite ends thereof. The upper member is also provided with depending flanges $h$ along its edges which engage the side edges of the lower member. These flanges and lugs assist the hinge members in alining the rims of the pan when the implement is closed ready for cooking, the flanges $h$ tending to prevent movement transverse with respect to a line extending from the handle to the hinge and the lugs $g$ preventing movement in a direction in line with the handle and the hinge. To further insure alinement of the pan rims, I provide the rims with flanges $i$ and these flanges serve the further purpose of assisting in retaining the juices and the odors as they "break" the joints between the pans.

In the lower pan is a loose gridiron $j$ and in the upper pan, against the inner face of the top thereof, is secured a companion gridiron $k$, the adjacent faces of the two gridirons being substantially parallel. The upper gridiron is removably secured in place, preferably by lugs $l$ attached to the upper pan and extending inwardly under the gridiron; this grid may be removed by rotating it far enough to bring the lugs into alinement with the notches $m$ in the edges of the grid.

Both gridirons are preferably used in broiling meats and it will be observed that the meat may be thoroughly cooked and basted on both sides by simply reversing the implement to bring the upper pan in turn against the fire. In the same way this implement may be used for toasting bread, and furthermore it may be used for steaming bread or other articles by placing a small quantity of water in the lower pan. By removing one or the other or both gridirons it will be seen that the implement may be employed for frying and for roasting and that in either case the meats may be thoroughly cooked and basted by reversing the implement.

It will be observed that this implement may be used for other purposes and in other ways; for instance, if hot coals be placed in it it may be used as a bed warming pan.

If desirable, one or both of the shortest bars $n$ of each grid may be notched about midway its ends and at the corner which is adjacent to the adjacent wall of the pan, as at $o$, for the reception and retention of a fork or knife or other implement for the purpose of removing the grid from the pan while hot.

Having thus described my invention, what I claim as new and desire to secure by Letters Patent, is—

A cooking utensil consisting of a lower pan, an upper pan inverted thereon and having its rim contacting closely with the rim of the lower pan, hinge means connecting the pans, companion handle members attached to the pans and adapted to lie one upon the other so that by grasping the handle the pans will be held together, means for holding the rims of the pans in alinement, and means whereby when the utensil is inverted the liquid will be conducted across the joint between the pans, said means consisting of a lip $i$ formed on the inner edge of one of the pans and extending upwardly upon the face of the other pan and a similar reversely-arranged lip at the other side of the pan.

In testimony whereof I hereunto affix my signature in the presence of two witnesses.

JOSEPH S. KNOWLES.

Witnesses:
J. E. BEVAN,
A. H. YEAKEL.

Copies of this patent may be obtained for five cents each, by addressing the "Commissioner of Patents, Washington, D. C."